(12) United States Patent
Bradshaw

(10) Patent No.: US 9,795,890 B1
(45) Date of Patent: Oct. 24, 2017

(54) MOBILE SHEET FLOW WATER RIDE APPARATUS

(71) Applicant: Jerry Boyc Bradshaw, Eagle Mountain, UT (US)

(72) Inventor: Jerry Boyc Bradshaw, Eagle Mountain, UT (US)

( * ) Notice: Subject to any disclaimer, the term of this patent is extended or adjusted under 35 U.S.C. 154(b) by 0 days.

(21) Appl. No.: 15/338,440

(22) Filed: Oct. 30, 2016

Related U.S. Application Data

(60) Provisional application No. 62/248,941, filed on Oct. 30, 2015.

(51) Int. Cl.
*A63G 21/00* (2006.01)
*A63G 31/00* (2006.01)
*A63B 69/00* (2006.01)

(52) U.S. Cl.
CPC ........ *A63G 31/007* (2013.01); *A63B 69/0093* (2013.01); *A63G 21/00* (2013.01)

(58) Field of Classification Search
CPC ........ A63G 21/00; A63G 21/02; A63G 21/18; A63G 31/00; A63G 31/007; A63B 69/00; A63B 69/093; A63B 2009/008; A63B 2208/12
USPC ...................... 472/116–117, 128; 482/70–71
See application file for complete search history.

(56) References Cited

U.S. PATENT DOCUMENTS

| | | |
|---|---|---|
| 3,598,402 A | 8/1971 | Frenzl |
| 3,913,332 A | 10/1975 | Forsman |
| 4,276,664 A | 7/1981 | Baker |
| 4,515,500 A | 5/1985 | Bastenhof |
| 4,522,535 A | 6/1985 | Bastenhof |
| 5,171,101 A | 12/1992 | Sauerbier et al. |
| 6,716,107 B2 | 4/2004 | Lochtefeld |
| 7,951,011 B2 | 5/2011 | Lochtefeld |
| 8,641,543 B2 | 2/2014 | Lochtefeld |
| 2013/0130815 A1* | 5/2013 | Lochtefeld ......... A63B 69/0093 472/128 |
| 2015/0057093 A1* | 2/2015 | Murphy ................ E04H 4/0006 472/128 |

* cited by examiner

*Primary Examiner* — Kien Nguyen
(74) *Attorney, Agent, or Firm* — Angus C. Fox, III

(57) ABSTRACT

The mobile sheet flow water ride apparatus of the present invention utilizes a rigid inclined structure. Ride surfaces, aisle surfaces, and surround fences are covered with protective inflatable air cushions. The ride apparatus of the present invention has non-retractable transport wheels and uses a multitude of adjustable jacks to take the load off the transport wheels and support the ride apparatus. The ride apparatus utilizes a 15,000 gpm double-suction pump driven by a 460-horsepower diesel engine that is transported in its own trailer. Water is pumped from a main storage tank through a horizontally-oriented nozzle that 2.438 meters wide and 6.35 cm high at supercritical speed. The water rushes up the slope, over a berm at the top of the slope, and back into the main storage tank through a square main return grate.

20 Claims, 15 Drawing Sheets

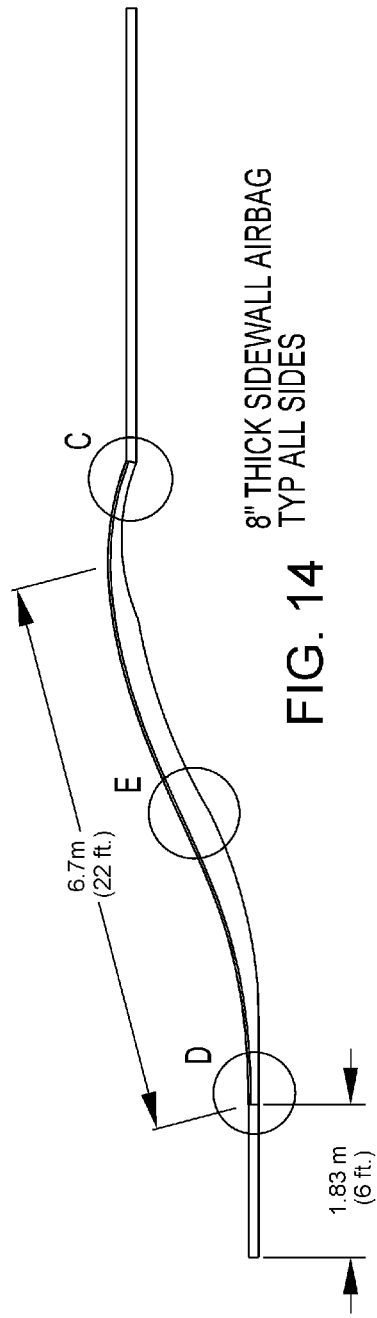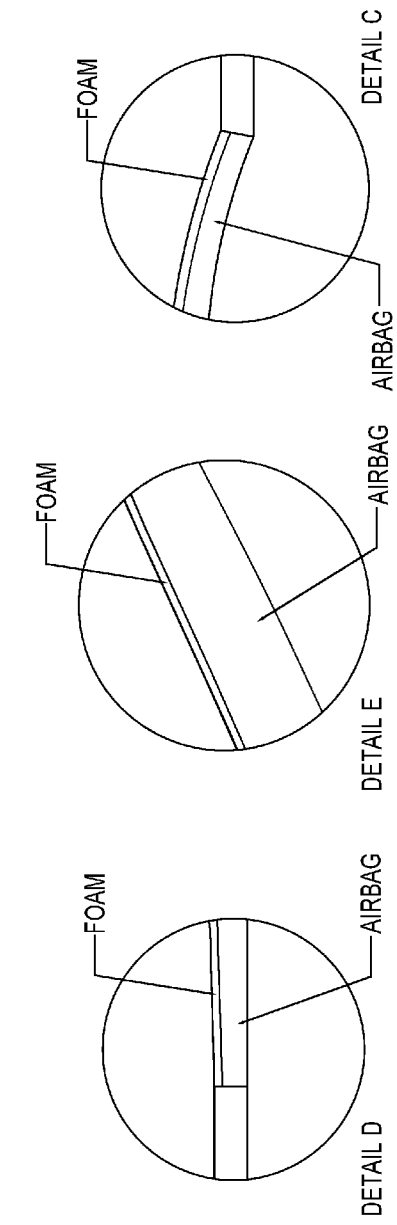

MOBILE SHEET FLOW WATER RIDE APPARATUS

FIELD OF THE INVENTION

The present invention relates, generally, to sheet flow water ride apparatuses that provide a simulated surfing experience and, more particularly, to a sheet flow water ride apparatus that can be towed and otherwise transported between venues.

BACKGROUND OF THE INVENTION

Liquid wave generators have been common equipment at university engineering departments a part of a century. High school seniors interested in attending the California Institute of Technology were often given demonstrations using the school's wave wave generator.

Early equipment that generated waves for non-coastal surfing sports were little more than scaled up versions of wave generators used by college students. U.S. Pat. No. 3,913,332 to Forsman provided an apparatus for producing continuous surfing waves within a circular channel structure. U.S. Pat. No. 4,515,500 to Bastenhof provided a surfing wave generator which could launch a succession of singular waves across the surface of a swimming pool. U.S. Pat. No. 4,522,535, also to Bastenhof, and U.S. Pat. No. 4,276,664 to Baker were other such apparatuses.

Over the past several decades, sheet flow water rides have become popular. Otto Frenzl was one of the first inventors to patent such an apparatus. Frenzl's U.S. Pat. No. 3,598,402, which issued in 1971, discloses a water sheet flow apparatus having the fundamental features that are found on present-day sheet flow apparatuses: a ramp; a water storage tank, or vat, below the ramp; a powerful pump for pumping water from the tank up the ramp; a drain at the top of the ramp, which returns water to the tank; and padded surfaces to protect those who are "surfing" the sheet of water on the ramp.

Thomas J. Lochtefeld of San Diego, Calif., has been involved in the development of water sheet flow equipment since the early 1990s. U.S. Pat. No. 5,171,101 to Lochtefeld and Sauerbier discloses a wave-forming generator for generating a sheet flow of water up an inclined surface, which can be used for surfing and water skimming sports. U.S. Pat. No. 6,716,107 to Lochtefeld discloses a containerless sheet flow water ride that avoids disadvantageous boundary layer effects associated with sidewall containers. U.S. Pat. No. 7,951,011 to Lochtefeld (hereinafter the '011 Patent) discloses a portable water ride having a trailer with a water catch basin built therein. Water is pumped through a nozzle up an inclined ride surface, which is stretched between stowable support members. Surfing and water skimming maneuvers can be performed on the flowing sheet of water. A walkway on either side of the ride surface, as well as an entrance platform at the top of the ride surface, and other grated platforms and railings can be provided. U.S. Pat. No. 8,641,543 issued as a continuation of U.S. Pat. No. 7,951,011. Both of these patents relate to a standing wave sheet flow water ride attraction adapted to inject a sheet flow of water under pressure onto a contoured, inclined ride surface. By injecting water under pressure in this manner at a supercritical speed (i.e., a speed faster than the speed of wave propagation), the sheet flow is supported underneath by the ride surface and conforms without breaking to the contours thereof. This allows a rider to perform water skimming and simulated surfing maneuvers on the ride surface and sheet flow by using the force of gravity and the upward momentum created by the upward flow, wherein the rider can oscillate back and forth in substantial equilibrium while performing maneuvers thereon.

Thomas J. Lochtefeld is not only an inventor, but has also been a member of the California bar since 1977. Since 1988, forty-five patents have been granted to him and his co-inventors. He has also been very aggressive in litigating against would-be competitors.

Typically, these sheet flow water rides are considerably smaller and have a smaller footprint than traditional water rides, such as wave pools, water slides and log rides, etc., and therefore, are less expensive to manufacture, construct and install than conventional water rides. Nevertheless, one of the drawbacks of these water rides is that there is the potential for reduced throughput and therefore reduced capacity. For example, in many cases, especially when smaller versions of the water ride are installed, only a single rider may be able to ride the water ride at any given time. Moreover, due to the nature of the ride, it is often desirable for riders to spend a longer period of time, i.e., more than just a few seconds, riding on the water ride so that they can learn the skills necessary to ride it properly. Riders will also need to ride it multiple times to achieve the skill sets necessary to perform adequately.

In spite of their inherent reduced capacity, as compared with other water rides, one of the main advantages of water sheet rides is that, in addition to being a participatory sport, they are also a popular spectator sport, in that they attract spectators who may not have a desire to directly participate in the ride, but are interested in watching the active participants. These water rides can also be used in connection with promotional and/or sponsorship activities by businesses that may be interested in using the water ride as a means of promoting the products and/or services that they sell. For example, third party businesses may have an interest in using the water ride at a planned promotional event or activity with surfing as a theme, and in such case, they might want to have the water ride available at a remote location which could help promote their products and/or services or other objective at that venue.

In view of the foregoing, portable versions of sheet flow water rides, which can be transported to and set up at remote locations where special events and activities are planned and held, have the potential to be very popular.

SUMMARY OF THE INVENTION

The present invention is a Mobile Sheet Flow Water Ride Apparatus that builds on the prior art disclosed in U.S. Pat. No. 3,598,402 to Otto Frenzl. It also scrupulously avoids the claims of Lochtefeld's '011 Patent.

A recurring limitation in every independent claim of the '011 Patent is a trampoline-like flexible ride surface tensioned between supports to form a ride surface. The mobile sheet flow water ride apparatus of the present invention, on the other hand, utilizes a rigid structure having both inclined and horizontal portions that are covered with aluminum sheets. The entire ride, the aisle surfaces, and the surround fences are covered with inflatable air cushions. There is also a protector sheet of heavy gauge, polyvinylchloride below and on top of the entire padded ride surface. Whereas the ride apparatus of the '011 Patent is transported on retractable wheels so that the ride apparatus rests on the ground, the ride apparatus of the present invention has eight, non-retractable transport wheels mounted in pairs on four individually-sprung straight axles, and uses thirty adjustable jacks to take the load off the transport wheels and support the ride apparatus. The axles, tires and wheels never support a load greater than the ride apparatus with empty water tanks and those attachments, which are transported separately from venue to venue, removed. The ride apparatus utilizes a turbo diesel internal combustion engine having an output of 343 kilowatts (460-horsepower), coupled to a speed-reduction transmission, to drive a double-suction pump that takes 56,781 liters (15,000 gallons) of water per minute from a 32,283 liter (8,000 gallon) main storage tank and forces them into a longitudinal conduit of square cross section. Near the front of the ride apparatus, the conduit flattens, does a upward ninety-degree turn, and transition into a horizontally-oriented 2.438 meters (8.0 feet)×6.35 cm (2.5 inches) rectangular nozzle at the base of the inclined rigid structure at supercritical speed. The water rushes up the slope, over a berm at the top of the slope, and into a square main return grate that is as wide as the nozzle. The water falls through the return grill back into the main storage tank. On each side of the rectangular nozzle is a secondary return grate having about an eighth the area of the main return grate. Limited amounts of water that do not make it over the berm and into the main return grate are caught by the secondary return grates. Below each secondary return grate is a 3,785 liter (1,000 gallon) catch tank that can be removed for transport. Water recovered by each catch tank is pumped by electric-motor-driven 5 hp pumps back to the main storage tank. An equalizer tube interconnects both catch tanks.

A staging or launch platform is positioned above and behind the rectangular nozzle. Stairs to the right and left of the launch platform provide ride access for riders. Riders exit the ride via a ladder or a water slide at the rear of the ride, which are located to the side of the main return grate.

In order to make the mobile sheet flow water ride apparatus of the present invention transportable, without the use of extra-wide transport permits, the ride apparatus can be broken down and folded so that it is no more than 2.438 meters (8.0 feet) in width. The PVC protector sheets and the inflatable air cushions are all removable and stowable in a separate support vehicle. The surround fences, which are installed in sockets, can be removed by lifting them straight up. They, too, are stowed in the separate support vehicle. The staging platform is upwardly foldable for transport, as are the horizontal side aisle platforms rearward of the secondary water return grates. As the aisle on either side of the ogee ride surface and berm do not lend themselves to a folded configuration, they are both removable for transport in the separate support vehicle. The horizontal rear side aisle platforms on either side of the main return grate are downwardly foldable, and can be secured in that position for transport. The thirty or so jacks are, or course, retracted and are folded along with the platforms which they support.

The diesel internal combustion engine that is used to power the dual-suction pump, as well as its speed-reduction transmission, are located within their own trailer that is securable to the framework of the ride apparatus. The transmission output shaft is coupled to the pump input shaft via a pair of U-joints and a drive shaft.

BRIEF DESCRIPTION OF THE DRAWINGS

FIG. 14 is a side elevational view of the inflatable pad of FIG. 13;

FIG. 15 is an enlarged view of the circular area D of FIG. 14;

FIG. 16 is an enlarged view of the circular area E of FIG. 14;

FIG. 17 is an enlarged view of the circular area F of FIG. 14; and

PREFERRED EMBODIMENT OF THE INVENTION

The new Mobile Sheet Flow Water Ride Apparatus will now be described in detail with reference to the attached drawing figures.

Figure 1:
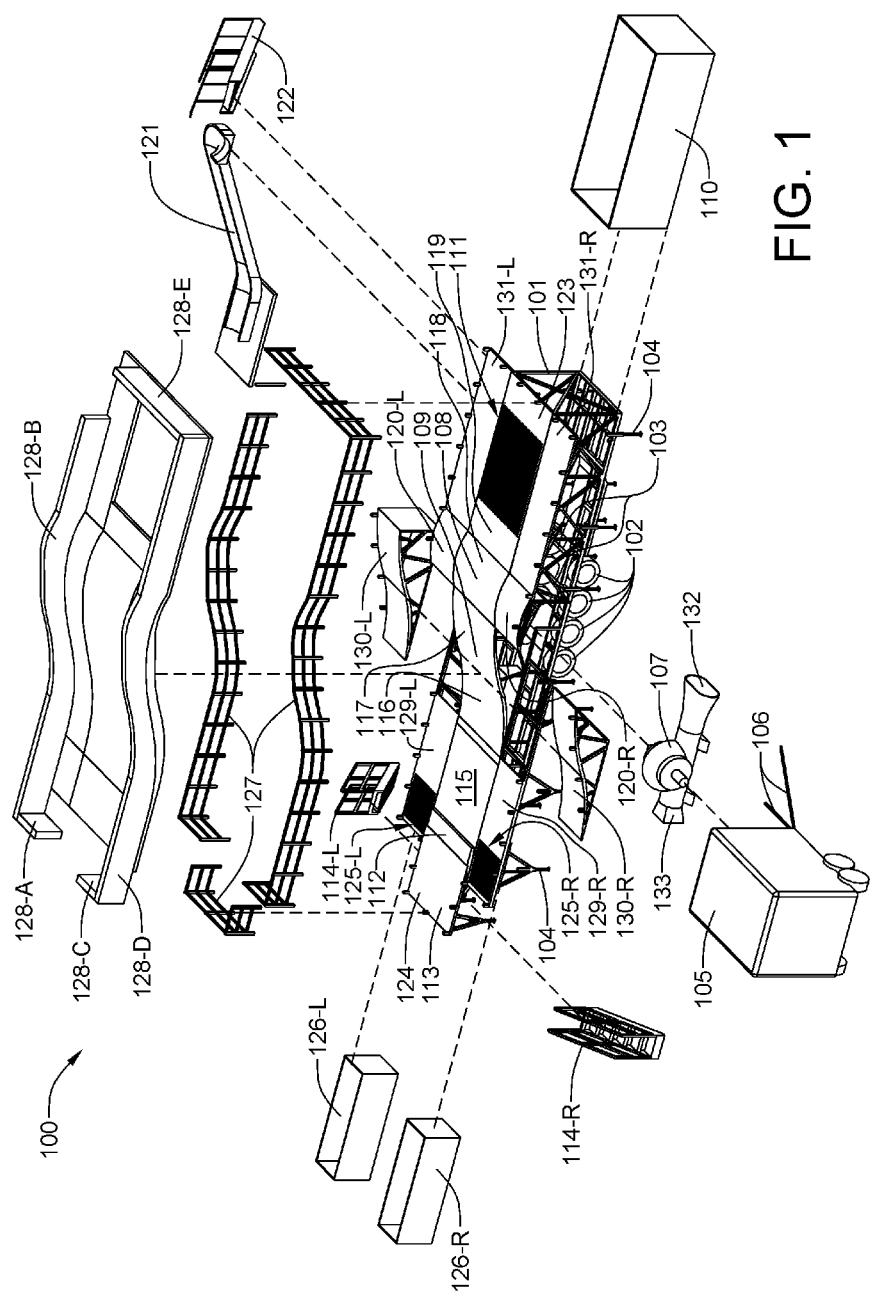
FIG. 1 is an exploded view of the new sheet flow water ride apparatus.

Referring now to the exploded view of FIG. 1, the Mobile Sheet Flow Water Ride Apparatus 100 is a trailer that includes a truss-style support structure 101, eight, non-retractable transport wheels 102 mounted in pairs on four individually-sprung straight axles 103, and incorporates thirty adjustable jacks 104, which take the load off the transport wheels 102 and support the completely-assembled ride apparatus when it is operational and holding approximately 40,000 liters (about 10,000 gallons) of water.

Still referring to FIG. 1, a 460 horsepower internal combustion diesel engine (not shown), a hydraulic clutch, and a speed-reduction transmission (none of which are visible in this view) are housed in a separate trailer 105 that can be attached to the support structure 101 with rigid bracing 106. A bell housing, which is bolted to the diesel engine, contains the flywheel and hydraulic clutch. The output shaft of the transmission, which is bolted to the bell housing, is coupled to a 56,781 liters (15,000 gallons) per minute dual-suction impeller-type pump 107 via a drive shaft and a double U-joint assembly at each end of the drive shaft. Though in this exploded view, the dual-suction pump 107 is shown disconnected from the power trailer 105 and the ride unit, it will be mounted within the support structure 101 below the berm 108 of the inclined ogee ride surface 109 (more about the ride surface later), forward of the main water storage tank 110 (tank not installed within the support structure 101 in this view), which is below the ride's main water return grate 111. Water is pumped from the main water storage tank 110 by the dual-suction pump 107 to a horizontally-oriented nozzle 112 of rectangular cross section. The nozzle 111 is 2.438 meters (8.0 feet) wide×6.35 cm (2.5 inches) high. A staging platform 113, located at the forward end of the ride, sits atop the nozzle 112 and provides a surface from which a rider can launch himself into the water sheet flow escaping from the nozzle 112 using a skim board or other such device. Ride access stairs 114-L and 114-R, which attach to opposite sides of the staging platform 113, provide new and returning riders access to the staging platform 113. A lower horizontal surface 115, which functions as a launching platform, positioned below the nozzle outlet, provides a level surface where riders can most easily enter the water sheet flow. The inclined ogee ride surface 109 which begins immediately following the lower horizontal surface 115, transitions from horizontal to an incline of maximum positive slope with a cylindrically concave surface 116 and then transitions from the incline of maximum slope back to horizontal with a cylindrically convex surface 117. At the crest of the inclined ogee ride surface 109, which is about 1.22 meters (about 4.0 feet) above the lower horizontal surface 115, there is a downward continuation 118 of the cylindrically convex surface 117 that intersects an elevated horizontal surface 119 that is immediately followed by a main water return grate 111. The downward continuation 118 of the cylindrically convex surface 117, which follows the inclined ogee ride surface that comprises cylindrically concave surface 116 and cylindrically convex surface 117, creates the berm 108 at the top of the ogee ride surface 109. Thus, the entire ride surface, which corresponds to the 2.438 meters (8.0 feet) wide surface directly in front of the nozzle, comprises the lower horizontal surface 115, the cylindrically concave surface 116, the cylindrically convex surface 117, the downward continuation 118 of the cylindrically convex surface 117, and the final horizontal surface 119. Much like a beam of non-coherent light tends to diverge with distance from the source, the water discharged from the nozzle 112 tends to diverge somewhat as its distance from the nozzle 112 increases. Immediately adjacent the right and left sides of the complete ride surface are side aisles 120-L and 120-R that are generally outside the water sheet flow emanating from the nozzle 112. These side aisles 120-L and 120-R enable a rider who has crashed, or otherwise fallen, to step into aisle 120-L and walk to the end of the ride and exit via the water slide 121 or exit stairway 122. If the rider is on the right side of the ride, he must walk down aisle 120-R, past the main water return grate 111, turn to the left and walk on the rear aisle 123 over to the left aisle 120-L, and then exit via the water slide 121 or exit stairway 122. The ride surface and the walking surfaces in the aisles is made of 3.175 mm (0.125 inch) thick aluminum decking 124 that is screwed to a framework having the appropriate slope for each portion of the ride. A straight edge placed laterally anywhere on the ride surface will also be flush with both adjoining aisle surfaces. It will be noted that each of the aisle sections forward of the inclined ogee ride surface 109 incorporates a secondary water return grate 125-L and 125-R. Water discharged by the nozzle 112 that doesn't make it over the berm 108, as the result of divergence of the flow along the edges of the main sheet flow or because of interaction with a rider or his equipment, flows down the side aisles 120-L or 120-R and flows downwardly through the secondary water return grates 125-L or 125-R, respectively, into a 3,785 liter (1,000 gallon) left or right catch tank, 126L or 126R, respectively. In this exploded view, the catch tanks 126-L and 126-R are shown apart from the ride unit. However, during operation they are positioned below their associated secondary water return grates 125-L or 125-R. Water recovered by each catch tank is pumped by 5 horsepower electric-motor-driven pumps back to the main storage tank 110. An equalizer tube, which interconnects both catch tanks 126-L and 126-R, maintains approximately even water levels in both catch tanks 126-L and 126-R.

Still referring to FIG. 1, a surround fence 127 that prevents riders from falling off the outer edges of the staging platform 113, side aisles 120-L and 120-R, and rear aisle 123 is installable in sockets affixed to the staging platform 112, side aisles 120-L and 120-R, and rear aisle 123. The surround fence 127 can be removed and transported separately between ride venues. Air-inflatable cushions are used to protect the riders. The surround fence is covered with inflatable cushions 128-A, 128-B, 128-C, 128-D and 128-E. The ride surface and upward-facing aisle surfaces are also covered with inflatable cushions. All of the pads are not visible in this view and they will be called out later in the disclosure. All of the safety padding is removable for transport.

Still referring to FIG. 1, because each of the aisles 120-L and 120-R is half as wide as the 2.438 meter-wide (8.0 feet-wide) ride surface, the completely assembled ride is fully 4.876 meters (16.0 feet) wide. Thus, the aisles must be either removed or folded so that the transportable ride structure is no wider than 2.438 meters (8.0 feet). The staging platform 113 and its associated support fold upwardly. The pair of forward platforms 129-L and 129-R, that form the forward portions of side aisles 120-L and 120-R, respectively, which incorporate the secondary water return grates 125-L and 125-R, respectively, and which support the forward ends of the ogee aisle structures 130-L and 130-R, respectively, are also upwardly foldable, as are their associated support jacks, which remain attached to their respective platforms 129-L or 129-R. As the ogee aisle structures 130-L and 130-R do not lend them selves to folding, they are removed and transported between ride venues on a separate support vehicle. The pair of rear platforms 131-L and 131-R, which straddle the main water return grate 111 and support the rear ends of the ogee aisle structures 130-L and 130-R, respectively, are downwardly foldable, as are their associated support jacks, which remain attached to their respective platforms 131-L and 131-R.

Still referring to FIG. 1, a clarification should be made with respect to the dual-suction pump 107. The intake 132, though shown attached to the pump 107, is actually constructed unitary with the main water storage tank 110. In addition, the exhaust 133 is fabricated as part of the longitudinal duct 202. The intake 132 and the exhaust 133 are shown in this view merely to show how the connection of each is made to the pump 107.

Figure 2:
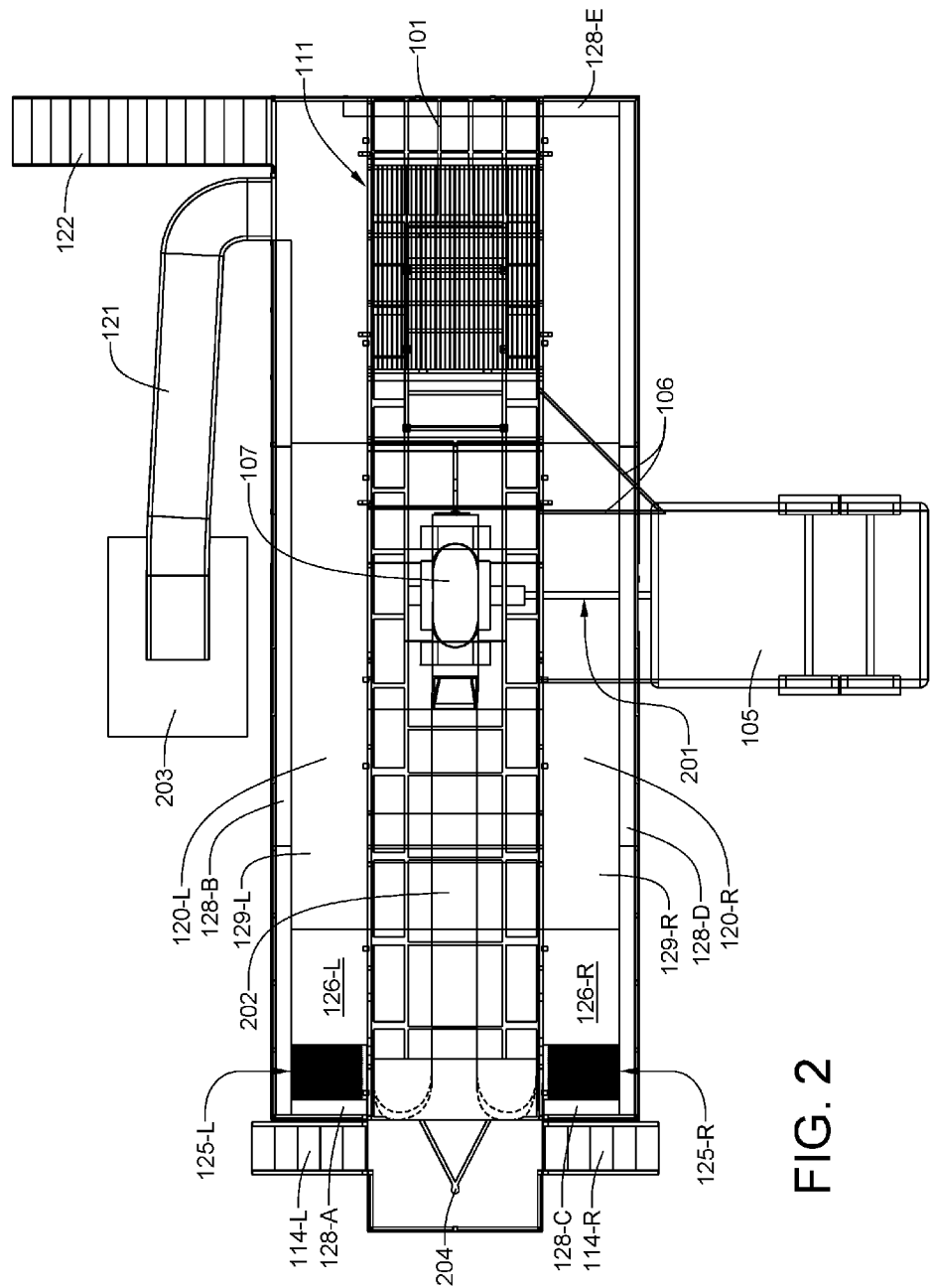
FIG. 2 is a top plan view of the new sheet flow water ride apparatus, with the main deck removed to show the understructure of the apparatus.

Referring now to FIG. 2, the mobile sheet flow water ride apparatus 100 is shown fully assembled, with the exception that the aluminum decking 124 has been removed to show the underlying structure. A drive shaft 201 that interconnects the speed-reduction transmission in the trailer 105 to the dual-suction pump 107 is visible in this view. In addition, the outline of the longitudinal duct 202 of rectangular cross section that takes water from the output of the pump 107 to the nozzle 112 is shown. Transition sections of the water ductwork between the main water tank 110 and the input of the pump 107, between the output of the pump 107 and entrance into the longitudinal duct 202 are not shown. The main water tank 110 extends the entire width of the ride surface, from the right edge of the truss style support structure 101 to the heavy line that is about even with the right side of the engine and transmission trailer 105. The water slide 121 has a landing pad 203, which can be designed in the form of a shallow tub so that water flowing down the slide into the tub can be pumped back to the main water tank 110. A female trailer hitch 204 is provided at the front of the mobile sheet flow water ride apparatus 200.

Figure 3:
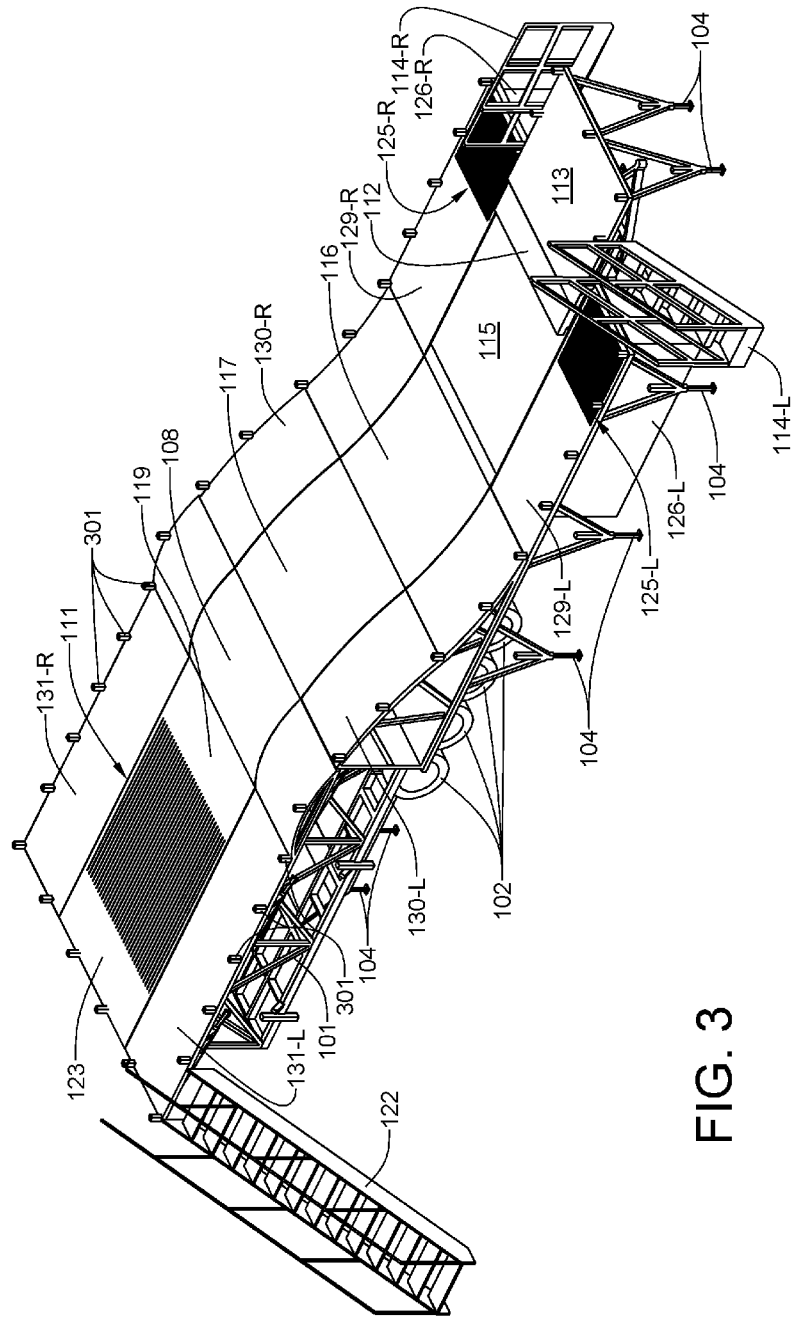
FIG. 3 is an isometric view of the new sheet flow water ride apparatus, from the entrance end of the ride, and with the railing and padding removed.

Referring now to FIG. 3, the mobile sheet flow water ride apparatus 200 is shown with the water slide 121, surround fence 127 and the inflatable and pads detached. The catch tanks 126-L and 126-R are installed beneath their respective second water return grates 125-L and 125-R, respectively. Detail of the main water return grate 119 is more visible in this view. The exit stairway 122 and entrance ride access stairs 113-L and 113-R are installed in this view.

Figure 4:
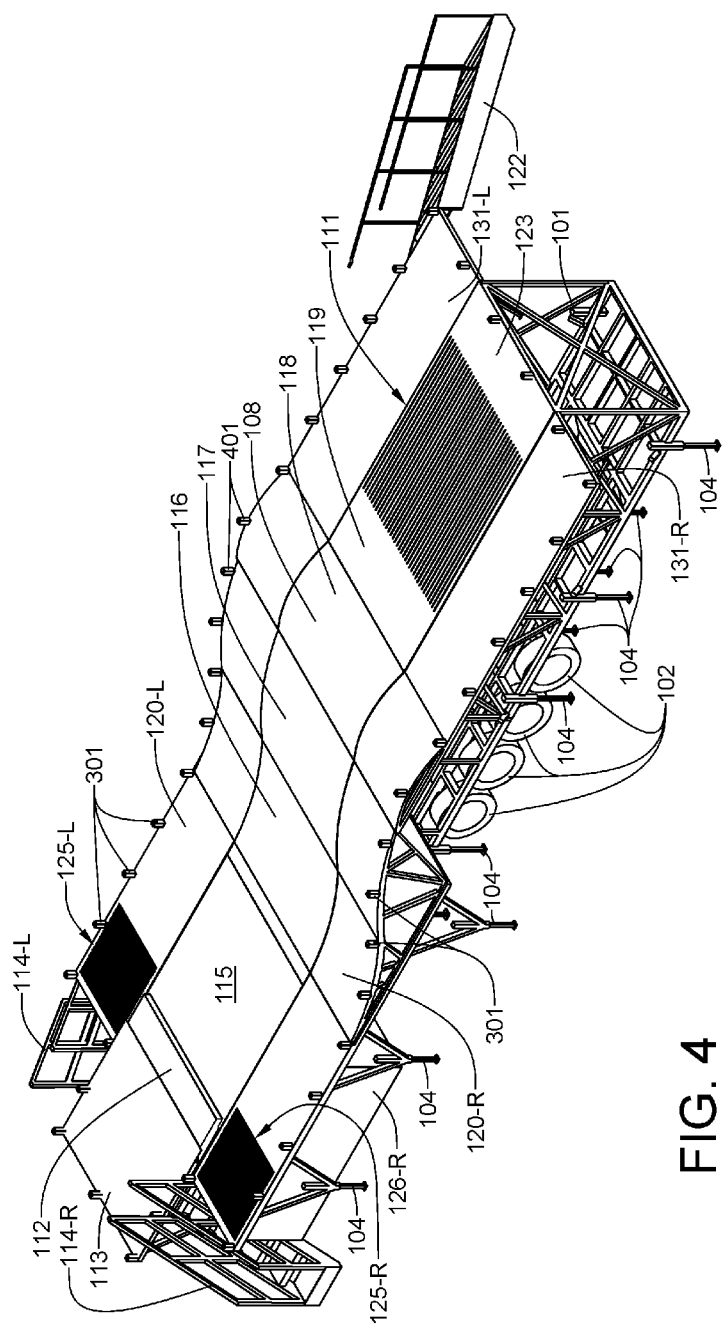
FIG. 4 is an isometric view of the new sheet flow water ride apparatus, from the exit end of the ride, and with the railing and padding removed.

Referring now to FIG. 4, the mobile sheet flow water ride apparatus 200 is shown in the same state of assembly as that of FIG. 3.

Figure 5:
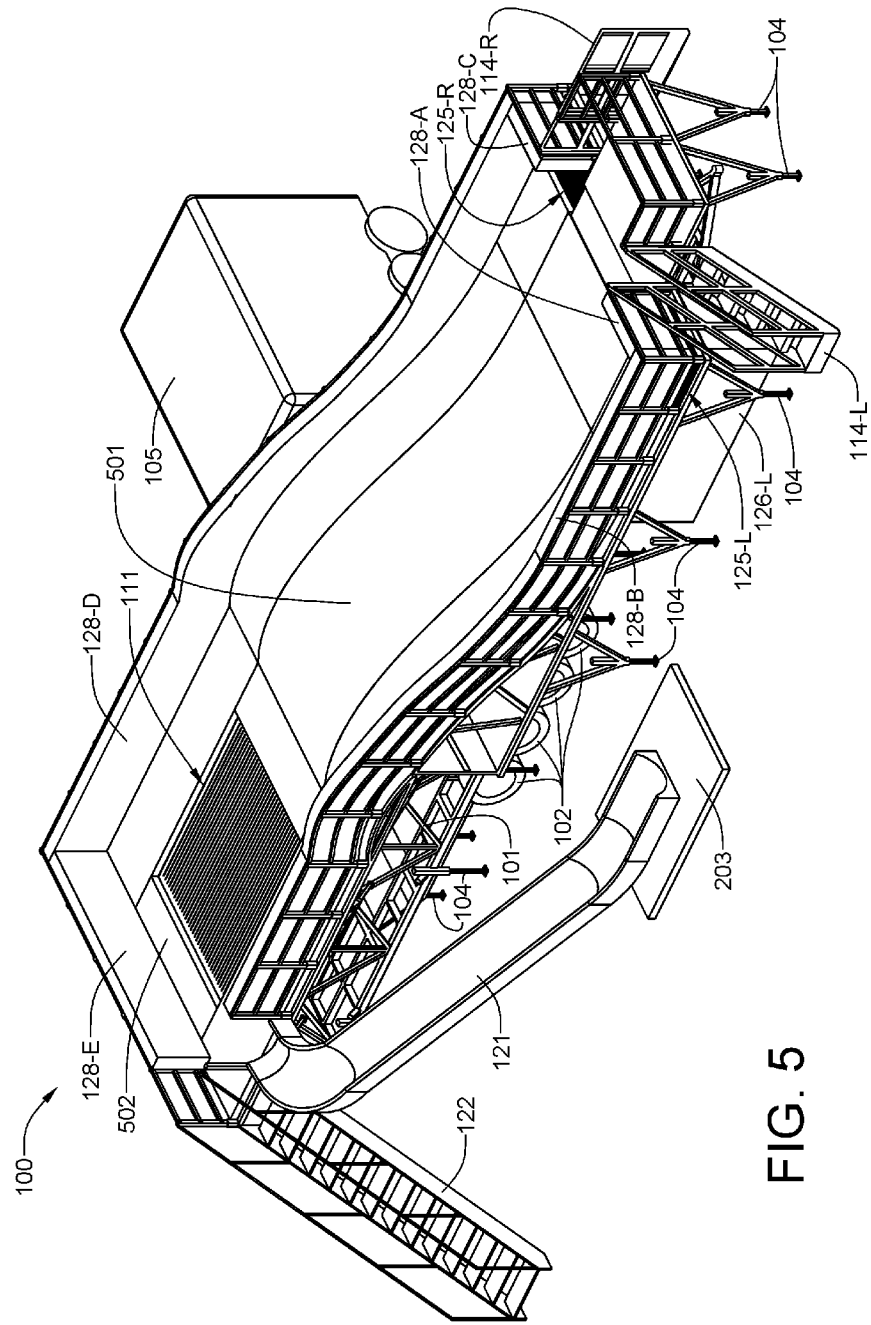
FIG. 5 is an isometric view of the new, fully-assembled sheet flow water ride apparatus, from the exit end of the ride.

Referring now to FIG. 5, the mobile sheet flow water ride apparatus 200 is shown in a fully-assembled state in a left-side and front view. The engine and transmission trailer 105, the water slide 121, and the surround fence are secured to the support structure 101, and the inflatable pads 501 and 502 are installed to cover the ride surfaces and aisle surfaces.

Figure 6:
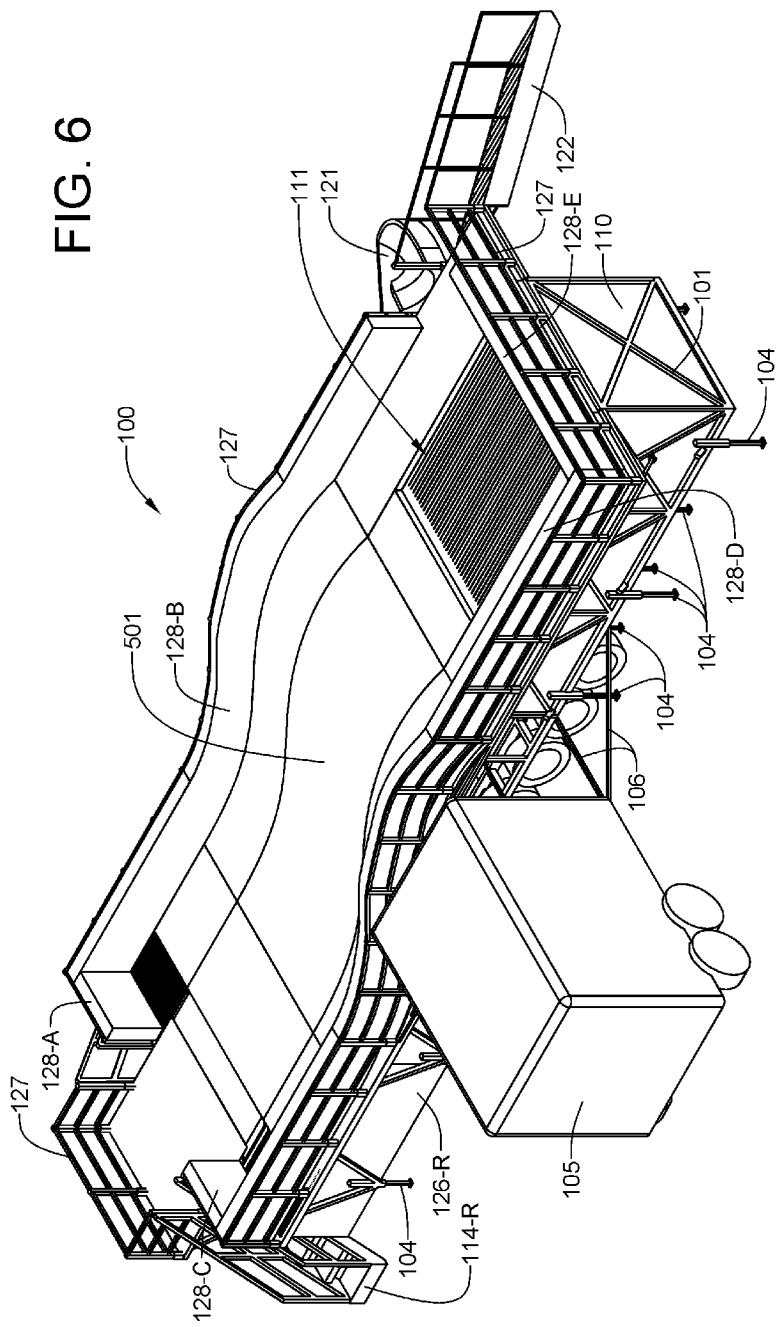
FIG. 6 is an isometric view of the new, fully-assembled sheet flow water ride apparatus, from the exit end of the ride.

Referring now to FIG. 6, the fully-assembled mobile sheet flow water ride apparatus 200 is seen from right-side and rear view.

Figure 7:
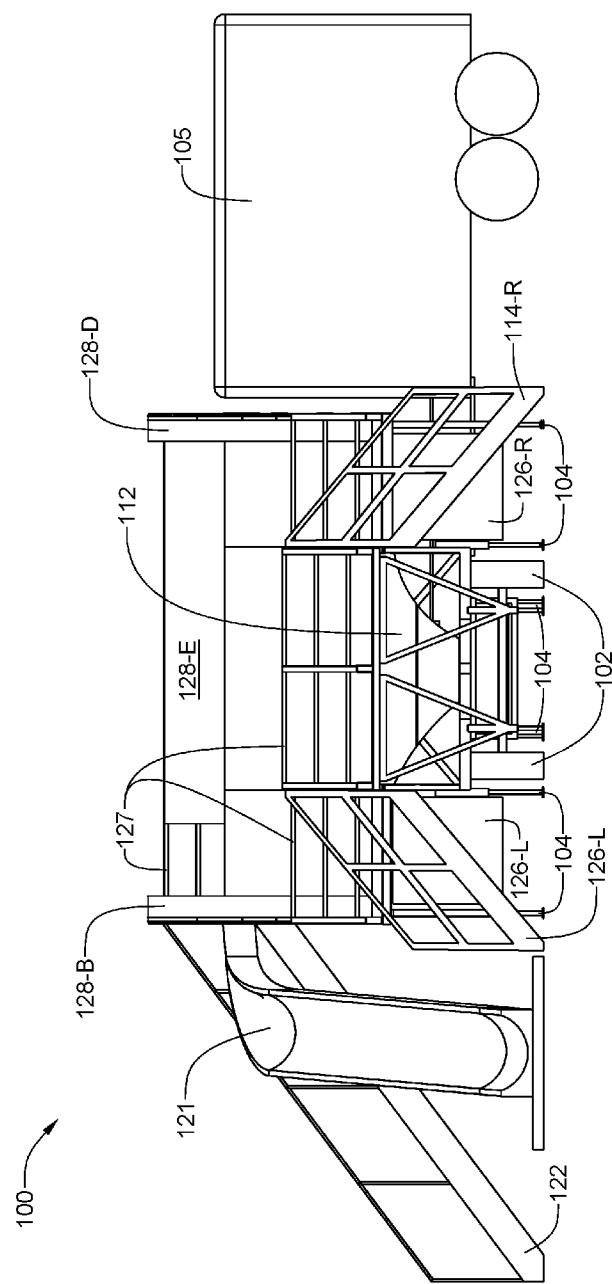
FIG. 7 is a front elevational view of the new, fully-assembled sheet flow water ride.

Referring now to the front view of FIG. 7, the fully-assembled mobile sheet flow water ride apparatus 200 is shown with the engine and transmission trailer 105, the water slide 121 and the rear exit stairs 122 secured to the support structure 101.

Figure 8:
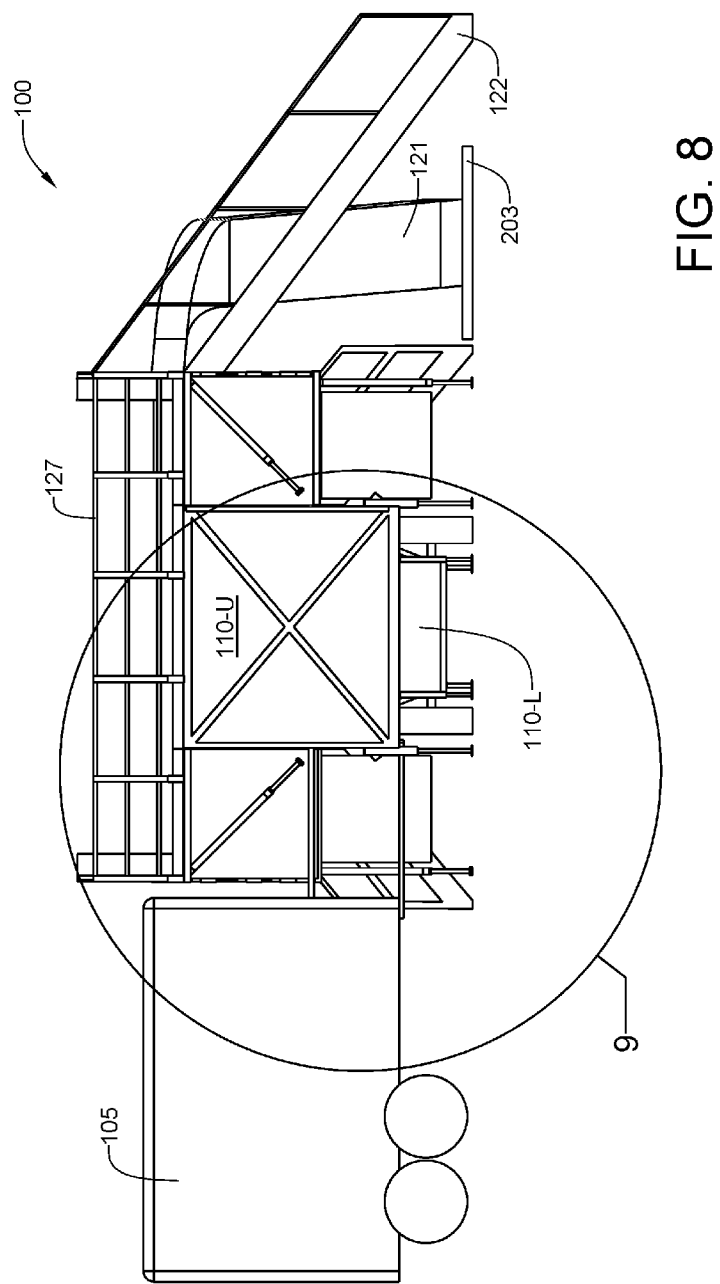
FIG. 8 is a rear elevational view of the new, fully-assembled sheet flow water ride.
Figure 9:
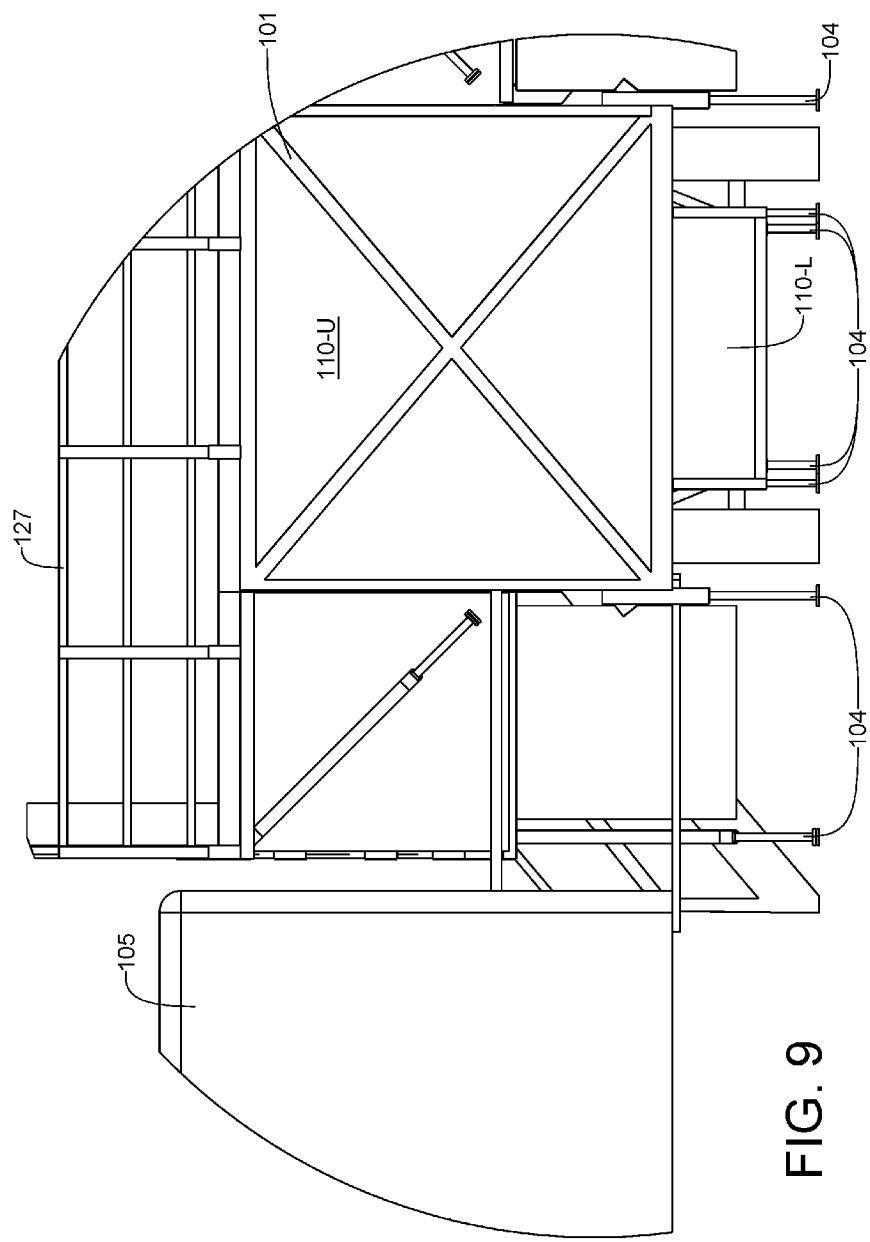
FIG. 9 is an enlarged view of the circular area 9 of FIG. 8.

Referring now to the rear view of FIG. 8, the main water tank 110 has an upper portion 110-U and a lower portion 110-L that is positioned between the track of the wheels 102. With the main water tank 110 installed, the dual-suction pump 107 is not visible from the rear of the mobile sheet flow water ride apparatus.

Referring now to the enlarged view of the circular area 9 of FIG. 8, the upper and lower portions, 110-U and 110-L, respectively, of the main water tank 110 are clearly visible. Also visible are the hydraulic struts 901-R and 901-L that support the right and left rear aisle platforms 131-R and 131-L, respectively.

Figure 10:
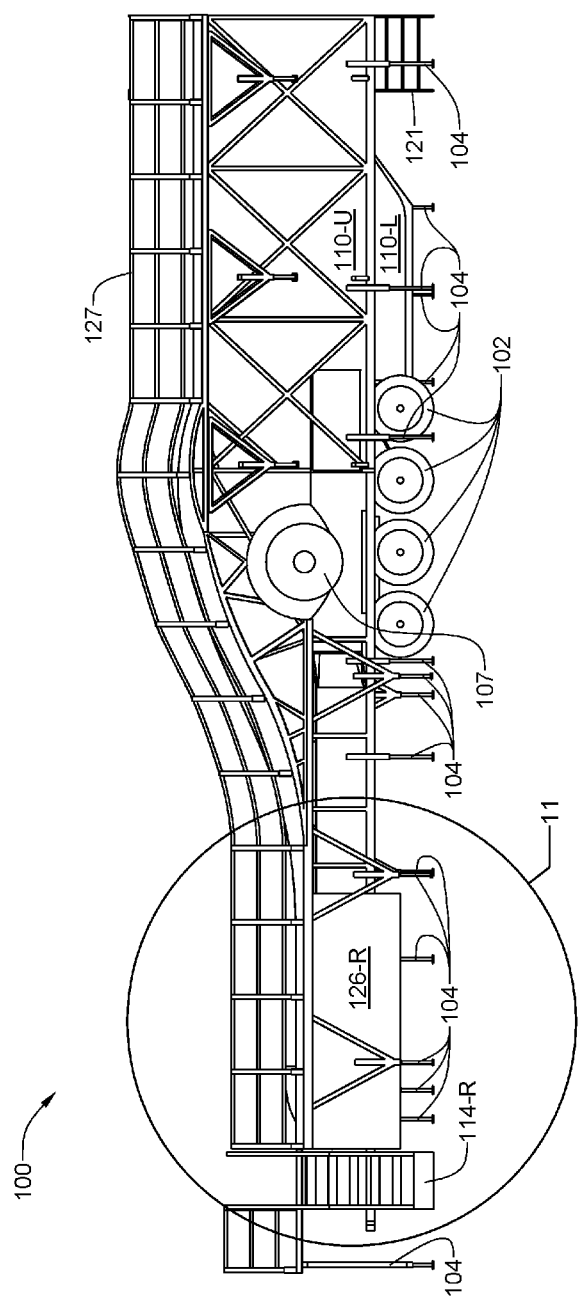
FIG. 10 is a right-side elevational view of the new sheet flow water ride, with the pump drive trailer removed to show the pump.

Referring now to FIG. 10, in this right-side view of the mobile sheet flow water ride apparatus 200, the engine and transmission trailer 105 has been removed to show the installed position of the dual-suction pump 107. The decking pad that covers the ogee and berm ride surface and adjacent aisle surfaces is of an inflatable type, as are the pads which cover the surround fence 127.

Figure 11:
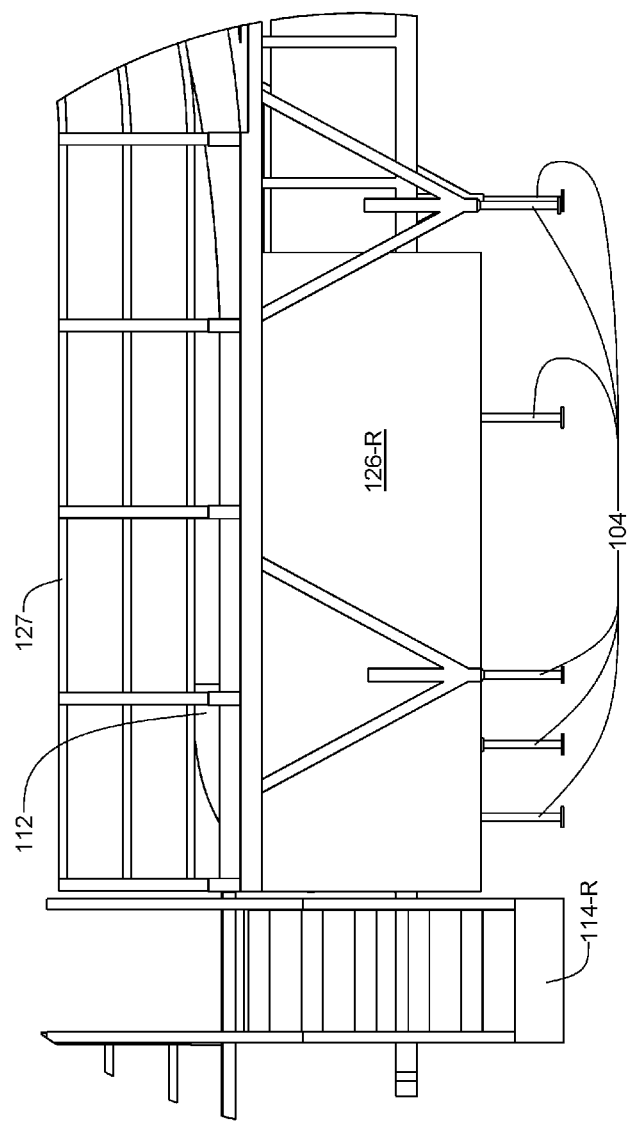
FIG. 11 is an enlarged view of the circular area 11 of FIG. 10.

Referring now to FIG. 11, the enlarged view of the circular area 11 of FIG. 10, the right catch tank 126-R is clearly visible, as are the right access stairs 113-R.

Figure 12:
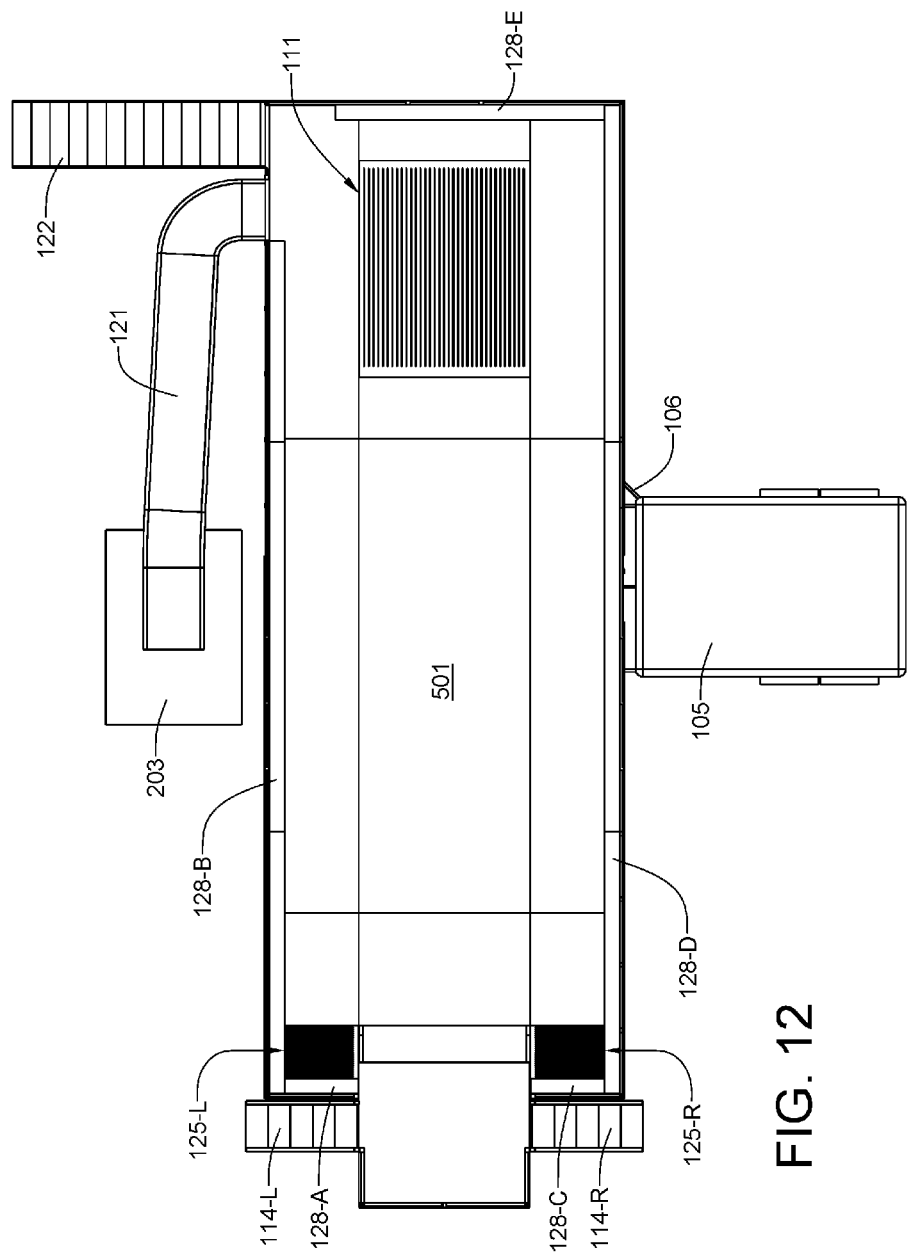
FIG. 12 is a top plan view of the fully-assembly sheet flow water ride.

Referring now to FIG. 12, top view of the completely-assembled mobile sheet flow water ride apparatus 200 shows all of the padding in place. The inflatable pads for the surround fence 127 include pads 128-A, 128-B, 128-C, 128-D and 128-E, each of which is preferably about 20 mm (8 inches) in thickness. A first inflatable pad 1201 is used to cover the lower horizontal surface 115 and the left and right aisle portions directly adjacent the lower horizontal surface 115. A second inflatable pad 1202 is used to cover the crash zone, which corresponds to the inclined ogee ride surface 109, the downward continuation 117 beyond the crest of the ogee ride surface 109, and the left and right ogee and berm aisle structures 130-L and 130-R. A third inflatable pad 1203 is used to cover the final horizontal ride surface 118, the rear aisle 123, and left and right rear platforms 130-L and 130-R aft of the crash zone berm. The main water return grate 119 and the left and right secondary water return grates 125-L and 125-R are clearly visible in this view.

Figure 13:
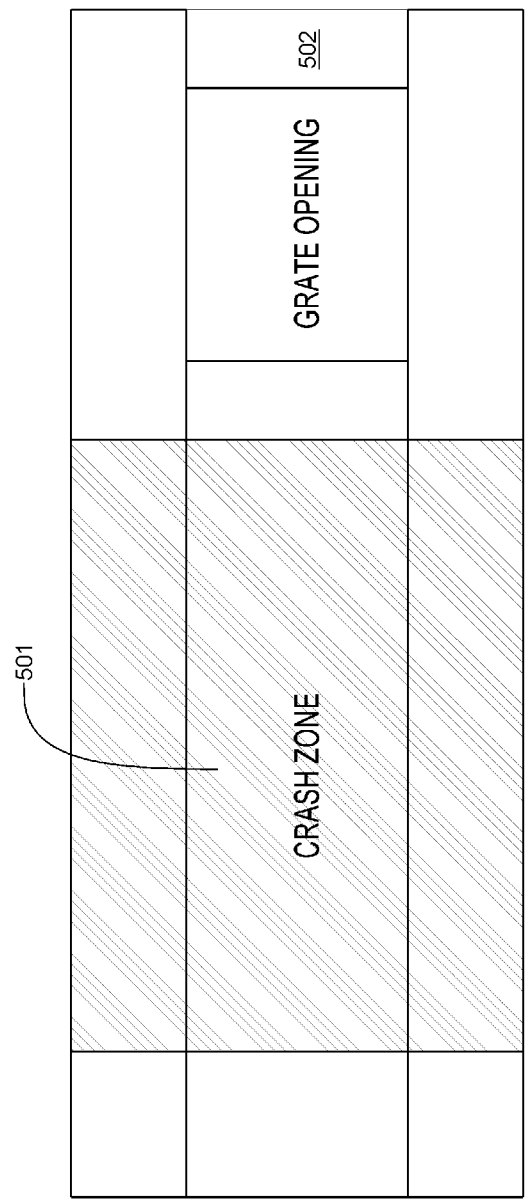
FIG. 13 is a top plan view of an inflatable pad used to cover the deck of the new sheet flow water ride.

Referring now to FIG. 13, the padding that covers the majority of the aluminum decking 124 of the ride and aisle surfaces preferably comprises inflatable pads having a nominal thickness of 10 cm (4 inches). The crash zone, which corresponds to inclined ogee ride surface 109 and the cylindrically convex downward continuation section 117 beyond the crest and the left and right ogee and berm aisle structures 130-L and 130-R is covered with thicker inflatable pads that taper from 10 cm (4 inches) to 20 cm (8 inches) in thickness. There is a heavy PVC layer between the decking and the inflatable pads and on top of the inflatable pads.

Referring now to FIGS. 14, 15, 16 and 17, a side view of the decking pad shows the construction thereof in greater detail. The crash zone is covered with an inflatable pad that is, preferably, up to 20 cm (8 inches) thick.

Figure 18:
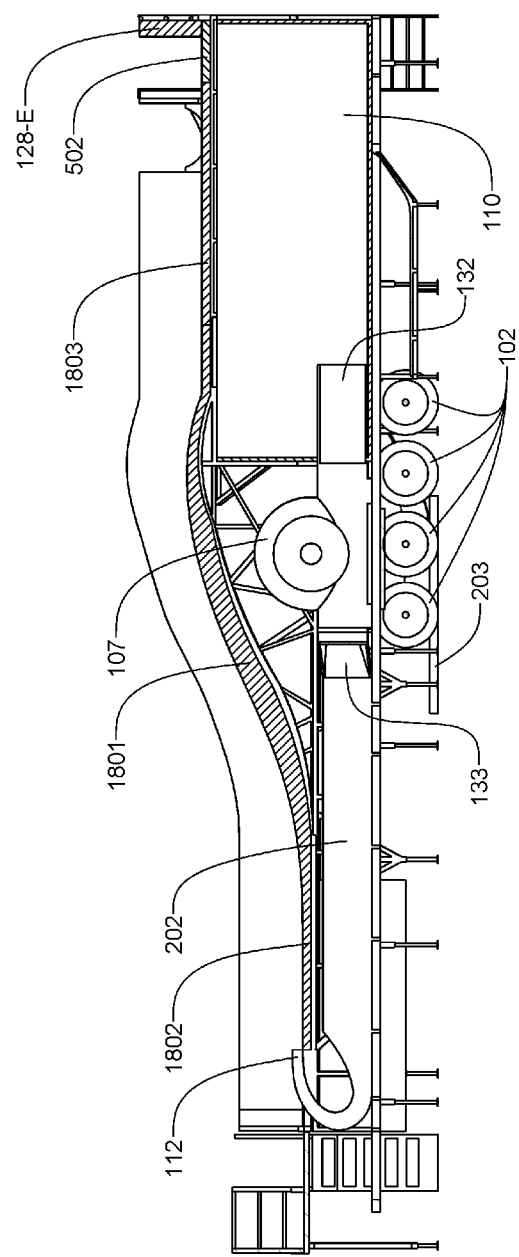
FIG. 18 is cross-sectional view of the new sheet flow water ride, taken through a vertical plane passing through the longitudinal centerline of the ride apparatus.

Referring now to FIG. 18, this side view shows the composition and thickness of the various types of pads, which have previously been fully described. It will be noted that the longitudinal duct 202, the intake 132 to the pump 107 and the exhaust 133 from the pump 107 are visible in this drawing figure.

Although only a single embodiment of the new mobile sheet flow water ride apparatus has been shown and described, it will be obvious to those having ordinary skill in the art that changes and modifications may be made thereto without departing from the scope and the spirit of the invention as hereinafter claimed.

What is claimed is:
1. A mobile sheet flow water ride apparatus comprising:
a trailer with front and rear ends having a truss-style support structure, a main water storage tank, at least one catch tank, a plurality of non-retractable transport wheels, a plurality of adjustable jacks, which unload the transport wheels and support the ride apparatus when it is completely assembled, operational and the main water storage tank and said at least one catch tank are, at least partially, filled with water;
a horizontally-oriented nozzle of rectangular cross section positioned at the front end of the trailer;
a ride surface that begins with a lower horizontal surface, which functions as a launching platform, positioned below a lower edge of the nozzle, said lower horizontal surface transitioning to an ascending surface that joins an elevated horizontal surface toward the rear end of the trailer, said ride surface formed from resilient pads that cover rigid decking material that is secured to the support structure;
a pump for supplying a continuous flow of water, under pressure, from the main water storage tank to the nozzle, which produces a water sheet flow that is propelled up the ride surface;
an internal combustion engine to power the pump;
ductwork that connects the main water storage tank to the pump;
a longitudinal duct that connects the pump to the nozzle; and
a return water grate behind the elevated horizontal surface through which water, that reaches the elevated horizontal surface, returns to the main water tank.

2. The mobile sheet flow water ride apparatus of claim 1, wherein said ride surface is ogee shaped.

3. The mobile sheet flow water ride apparatus of claim 1, wherein said nozzle and said ride surface are about 2.438 meters wide.

4. The mobile sheet flow water ride apparatus of claim 1, wherein said pump is a dual-suction, impeller-type pump having an output of about 56,781 liters per minute.

5. The mobile sheet flow water ride apparatus of claim 1, wherein said internal combustion engine is a turbocharged diesel engine having a power output of about 343 kilowatts.

6. The mobile sheet flow water ride of claim 1, which further comprises an aisle on each side of the ride surface, said aisles being generally outside the water sheet flow emanating from the nozzle, and enabling a rider who has fallen, to step into aisle, walk to an end of the ride and exit the ride.

7. The mobile sheet flow water ride of claim 1, wherein the aisles are provided by platforms, some of which fold and others of which are removable in order to maintain an acceptable trailer width for movement on roads and highways.

8. The mobile sheet flow water ride of claim 1, wherein water that does not reach the elevated horizontal surface and runs down the aisles is captured in said at least one catch tank, whence it is pumped to the main water storage tank.

9. A mobile sheet flow water ride apparatus comprising:
a trailer with front and rear ends having a truss-style support structure, a main water storage tank, at least one catch tank, a plurality of non-retractable transport wheels, a plurality of adjustable jacks, which unload the transport wheels and support the ride apparatus when it is completely assembled, operational and the main water storage tank and said at least one catch tank are, at least partially, filled with water;
a horizontally-oriented nozzle of rectangular cross section positioned at the front end of the trailer;
a ride surface that begins with a lower horizontal surface, which functions as a launching platform, positioned below a lower edge of the nozzle, said lower horizontal surface transitioning to an ascending ogee-shaped surface which has a final, uppermost curving surface that reaches a peak about 1.22 m above the lower horizontal surface, and then transitions downward about 10 cm to join an elevated horizontal surface toward the rear end of the trailer, said ride surface formed from resilient pads that cover rigid decking material that is secured to the support structure;
an aisle on each side of the ride surface, said aisles being generally outside the water sheet flow emanating from the nozzle, and enabling a rider who has fallen, to step into aisle, walk to an end of the ride and exit the ride;
a pump for supplying a continuous flow of water, under pressure, from the main water storage tank to the nozzle, which produces a water sheet flow that is propelled up the ride surface;
a turbocharged diesel internal combustion engine to power the pump;
ductwork that connects the main water storage tank to the pump;
a longitudinal duct that connects the pump to the nozzle; and
a return water grate behind the elevated horizontal surface through which water, that reaches the elevated horizontal surface, returns to the main water tank.

10. The mobile sheet flow water ride apparatus of claim 9, wherein said nozzle and said ride surface are about 2.438 meters wide.

11. The mobile sheet flow water ride apparatus of claim 9, wherein said turbocharged diesel engine has a power output of about 343 kilowatts, and said pump is a dual-suction, impeller-type pump having an output of about 56,781 liters per minute.

12. The mobile sheet flow water ride of claim 9, wherein the aisles are provided by platforms, some of which fold and others of which are removable in order to maintain an acceptable trailer width for movement on roads and highways.

13. The mobile sheet flow water ride of claim 9, wherein water that does not reach the elevated horizontal surface and runs down the aisles is captured in said at least one catch tank, whence it is pumped to the main water storage tank.

14. A mobile sheet flow water ride apparatus comprising:
a trailer with front and rear ends having a truss-style support structure, a main water storage tank, a plurality of non-retractable transport wheels, a plurality of adjustable jacks, which unload the transport wheels and support the ride apparatus above a hard surface when it is completely assembled, operational and the main water storage tank and said at least one catch tank are, at least partially, filled with water;
a horizontally-oriented nozzle of rectangular cross section positioned at the front end of the trailer;
a ride surface that begins with a lower horizontal surface, which functions as a launching platform, positioned below a lower edge of the nozzle, said lower horizontal surface transitioning to an ascending surface that joins an elevated horizontal surface toward the rear end of the trailer, said ride surface formed from resilient pads that cover rigid decking material that is secured to the support structure;
a pump for supplying a continuous flow of water, under pressure, from the main water storage tank to the nozzle, which produces a water sheet flow that is propelled up the ride surface;
an aisle on each side of the ride surface, said aisles being generally outside the water sheet flow emanating from the nozzle, and enabling a rider who has fallen, to step into aisle, walk to an end of the ride and exit the ride;
a grate-covered catch tank on each side of the lower horizontal surface, each catch tank capturing water that does not reach the elevated horizontal surface and runs down an aisles, whence it is pumped to the main water storage tank;
an internal combustion engine to power the pump;
ductwork that connects the main water storage tank to the pump;
a longitudinal duct that connects the pump to the nozzle; and
a return water grate behind the elevated horizontal surface through which water, that reaches the elevated horizontal surface, returns to the main water tank.

15. The mobile sheet flow water ride apparatus of claim 14, wherein said ride surface is ogee shaped.

16. The mobile sheet flow water ride apparatus of claim 14, wherein said nozzle and said ride surface are about 2.438 meters wide.

17. The mobile sheet flow water ride apparatus of claim 14, wherein said pump is a dual-suction, impeller-type pump having an output of about 56,781 liters per minute.

18. The mobile sheet flow water ride apparatus of claim 14, wherein said internal combustion engine is a turbocharged diesel engine having a power output of about 343 kilowatts.

19. The mobile sheet flow water ride of claim 14, wherein the aisles are provided by platforms, some of which fold and others of which are removable in order to maintain an acceptable trailer width for movement on roads and highways.

20. The mobile sheet flow water ride of claim 14, which further comprises:
   a staging platform positioned atop the nozzle; and
   at least one set of steps that provide access to the launch platform from the hard surface.

* * * * *